(12) United States Patent
Kozin et al.

(10) Patent No.: US 12,041,510 B2
(45) Date of Patent: Jul. 16, 2024

(54) LOCATION METRICS FOR MONITORING OR CONTROL OF WIRELESS NETWORKS

(71) Applicant: Juniper Networks, Inc., Sunnyvale, CA (US)

(72) Inventors: Vladimir Vladimirovich Kozin, Livermore, CA (US); David Luu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 322 days.

(21) Appl. No.: 17/454,702

(22) Filed: Nov. 12, 2021

(65) Prior Publication Data
US 2023/0125903 A1  Apr. 27, 2023

Related U.S. Application Data

(60) Provisional application No. 63/262,912, filed on Oct. 22, 2021.

(51) Int. Cl.
| H04W 4/029 | (2018.01) |
| H04L 43/02 | (2022.01) |
| H04L 43/04 | (2022.01) |
| H04W 12/08 | (2021.01) |

(52) U.S. Cl.
CPC .................. H04W 4/029 (2018.02)

(58) Field of Classification Search
None
See application file for complete search history.

(56) References Cited

U.S. PATENT DOCUMENTS

| 7,634,267 B2 * | 12/2009 | Dobson ................. H04W 24/00 455/445 |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,832,082 B2 | 11/2017 | Dade et al. |

(Continued)

FOREIGN PATENT DOCUMENTS

| CN | 104486722 A | 4/2015 |
| WO | 2016180124 A1 | 11/2016 |

OTHER PUBLICATIONS

Extended Search Report from counterpart European Application No. 22203048.8 dated Feb. 14, 2023, 31 pp.

(Continued)

Primary Examiner — Kenneth B Wells
(74) Attorney, Agent, or Firm — Shumaker & Sieffert, P.A.

(57) ABSTRACT

This disclosure describes a system including a plurality of access point (AP) devices configured to provide a wireless network at a site; and a network management system (NMS) including a memory storing client-side data collected by a plurality of client devices associated with the wireless network and storing location data associated with each of the plurality of client devices generated by a location engine in response to location requests issued by each of the plurality of client devices, and one or more processors coupled to the memory and configured to determine, based on at least one of the client-side data and the location data, one or more location metrics associated with the location requests issued by the plurality of client devices.

17 Claims, 16 Drawing Sheets

(56) References Cited

U.S. PATENT DOCUMENTS

| | | | |
|---|---|---|---|
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 2008/0045234 | A1* | 2/2008 | Reed .................. H04W 4/023 455/456.1 |
| 2009/0047977 | A1 | 2/2009 | Malomsoky et al. |
| 2012/0149325 | A1 | 6/2012 | Titus et al. |
| 2013/0143602 | A1* | 6/2013 | Rodriguez .......... H04M 3/2236 455/456.5 |
| 2015/0089046 | A1* | 3/2015 | Waxman ............... H04L 49/206 709/224 |
| 2015/0312876 | A1 | 10/2015 | Syrjarinne et al. |
| 2020/0403890 | A1 | 12/2020 | McCulley et al. |
| 2021/0306201 | A1 | 9/2021 | Wang et al. |

OTHER PUBLICATIONS

U.S. Appl. No. 17/303,222, filed May 24, 2021, Juniper Networks, Inc. (inventor: Safavi), "Virtual Network Assistant Having Proactive Analytics and Correlation Engine Using Unsupervised ML Model".

Response to Extended Search Report dated Feb. 14, 2023, from counterpart European Application No. 22203048.8 filed Oct. 24, 2023, 20 pp.

* cited by examiner

LOCATION METRICS FOR MONITORING OR CONTROL OF WIRELESS NETWORKS

This application claims the benefit of U.S. Provisional Application No. 63/262,912, filed Oct. 22, 2021, which is incorporated by reference herein in its entirety.

TECHNICAL FIELD

The disclosure relates generally to computer networks and, more specifically, to monitoring and control of wireless networks.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices. The wireless client devices (also referred to herein as "client devices" or "wireless devices") include laptop computers, smartphones, tablets, wearable devices, appliances, Internet of Things (IoT) devices, etc. Knowing a location of a wireless client device is useful in a variety of applications. For indoor environments, which are generally not amenable to location determination via GPS, a variety of techniques can be used to determine the location of a wireless device.

SUMMARY

In general, this disclosure describes one or more techniques for a network management system (NMS) to remotely monitor and/or evaluate location performance in a wireless network based on one or more location metrics. The wireless network system includes one or more access point (APs), each including one or more wireless transmitters, configured to provide a wireless network at a customer premises or other site. The location metrics may be determined on an AP-level or a site-level, for example. The location metrics may include, for example, a latency metric (location request response time), a jitter or "teleport" metric (location accuracy), a dropped request metric (a percentage of location requests that are handled before drop), an AP uptime metric (a percentage of time one or more APs at the site are not down or unreachable), and a user connect time metric (a length of time users stay connected to location services while associated with a wireless network). Each location metric may further include one or more classifiers. Each of the location metrics and/or their classifiers may include configurable threshold(s) to customize the location metrics for a particular wireless network or customer site. If any of the location metrics or their classifiers do not meet their respective configurable threshold value set for the site, the failure may be attributed to one or more of the classifiers to further understand how and/or why the failure occurred.

The data for the location metrics may include, for example, client-level data received from a client-based software agent running on wireless client device(s) as part of a software development kit (SDK). The data for the location metrics may also include client-level location data from a location engine associated with a cloud-based NMS. The location engine may receive the data collected by the location applications/SDKs on the client devices either directly from the client devices or via the APs. The location engine generates location data based on the collected data on a per-client device basis. The NMS aggregates the client-level data and/or the client-level location data on an AP-level or a site-level basis. The NMS determines the one or more location metrics based on aggregated client-level data and/or the aggregated site-level location data.

Based on the location metric(s), the NMS may identify anomalies in the location performance of the wireless network, identify a root cause of one or more anomalies in the location performance of the wireless network, and/or automatically invoke one or more remedial actions to address the identified anomalies.

The techniques of the disclosure provide one or more technical advantages and practical applications. The techniques enable the NMS to automatically monitor and quantify location performance associated with a wireless network based on one or more location metrics. The location metric(s) account for one or more factors that may affect location determinations for wireless client devices associated with a wireless network. In this way, the location metric(s) quantify one or more factors that may affect the perceived quality of location services provided to the customer of a wireless service provider or to wireless client devices associated with the wireless network. For example, the techniques may determine a latency metric that quantifies a latency or amount of time to respond to location requests, a jitter or "teleport" metric which accounts for sudden changes in reported location due to imperfect estimation algorithms or interrupted communications, a dropped request metric that determines a percentage of time location requests were dropped, an AP uptime metric that determines a percentage of time one or more APs at the site are not down or unreachable, and a user connect time metric that tracks a length of time users stay connected to location services while associated with a wireless network. The techniques therefore enable the NMS to proactively monitor and quantify location performance associated with a wireless network. Based on the one or more location metrics, the NMS may further identify anomalies in the location performance, identify a root cause of one or more anomalies, automatically generate one or more notifications including recommended actions that may be taken to address the root cause of the anomalies, and/or automatically invoke one or more remedial actions intended to address the identified anomalies. In this way, the techniques of the disclosure may enhance location performance for wireless client devices associated with the wireless network, thus enhancing the user experience of one or more location services provided to client devices associated with the wireless network.

In one example, the disclosure describes a system comprising: a plurality of access points (APs) configured to provide a wireless network at a site; and a network management system comprising: a memory storing client-side data collected by a plurality of client devices associated with the wireless network and storing location data associated with each of the plurality of client devices generated by a location engine in response to location requests issued by each of the plurality of client devices; and one or more processors coupled to the memory and configured to determine, based on at least one of the client-side data and the location data, one or more location metrics associated with the location requests issued by the plurality of client devices.

In another example, the disclosure describes a method comprising receiving, by one or more processors of a network management system that manages a plurality of access point (AP) devices associated with a wireless network, client-side data collected by a plurality of client devices associated with the wireless network; receiving location data associated with each of the plurality of client devices generated by a location engine in response to location requests issued by each of the plurality of client devices; and determining, by the one or more processors and based on at least one of the client-side data and the location data, one or more location metrics associated with the location requests issued by the plurality of client devices.

In another example, the disclosure is directed to a non-transitory computer-readable storage medium comprising instructions that, when executed, configure processing circuitry to receive client-side data collected by a plurality of client devices associated with a wireless network and receive location data associated with each of the plurality of client devices generated by a location engine in response to location requests issued by each of the plurality of client devices; and determine, based on at least one of the client-side data and the location data, one or more location metrics associated with the location requests issued by the plurality of client devices.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
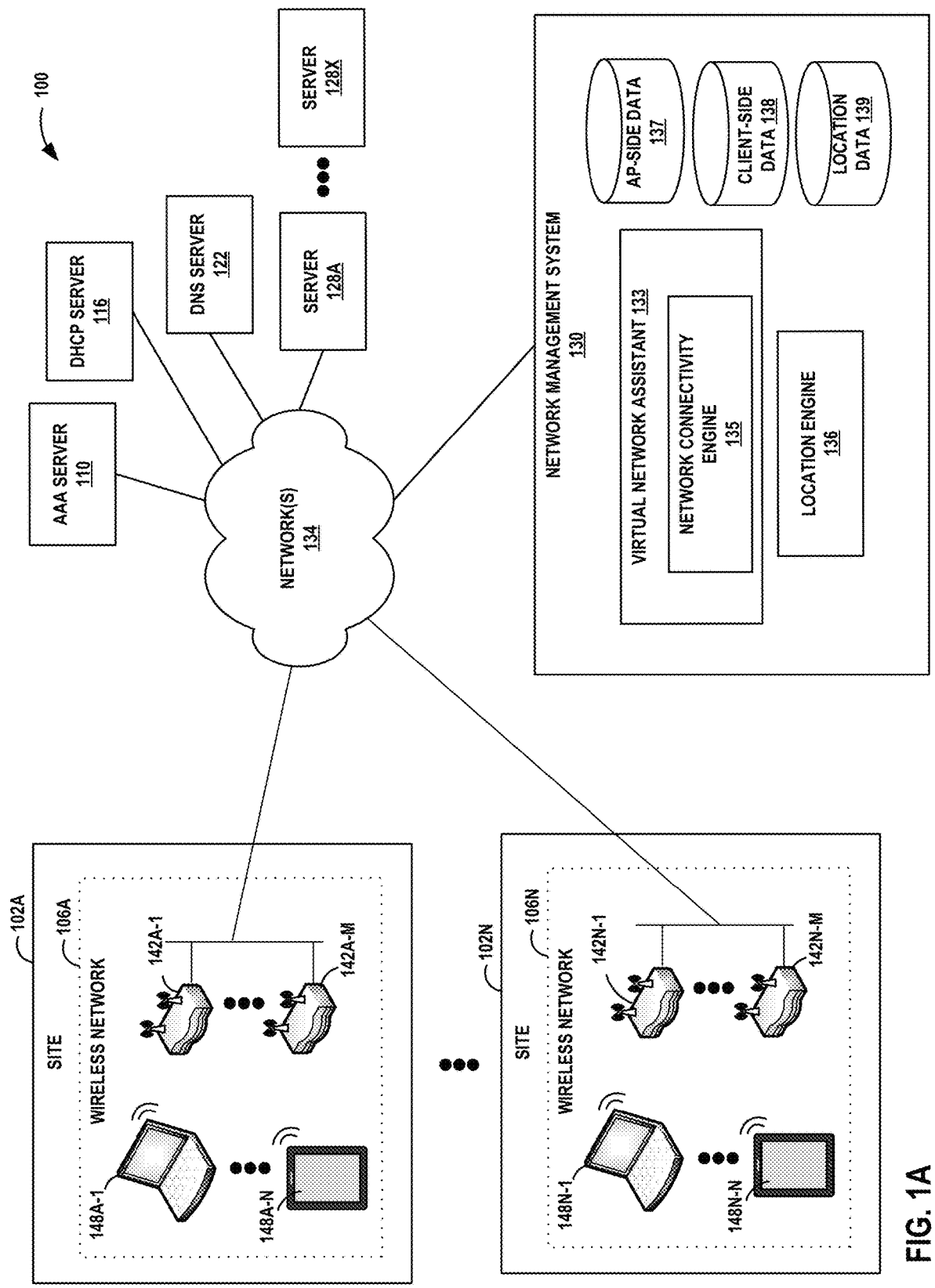
FIG. 1A is a diagram of an example network system 100 in which a network management system determines one or more location metrics to monitor location performance in a wireless network(s), in accordance with one or more techniques of the disclosure.

FIG. 1A is a diagram of an example network system 100 in which a network management system determines one or more location metrics to monitor location performance in a wireless network(s), in accordance with one or more techniques of the disclosure. Example network system 100, such as a network system for an organization or enterprise, includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. Although the example of FIG. 1A is described with respect to wireless network systems, the techniques described in this disclosure may apply to wired network systems and/or wireless network systems.

Each site 102A-102N also includes a plurality of wireless client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to wireless client devices, IoT devices and end users at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. NMS 130 may include a network performance engine that automatically determines one or more service level experience (SLE) metrics for each client device 148 associated with a wireless network 106. SLE metrics determined based on the collected network data can be used to measure various aspects of wireless network performance. SLE metrics seek to measure and understand network performance from the viewpoint of the end user experience on the network.

One example SLE metric is a coverage metric, which tracks the number of user minutes that a client device's received signal strength indicator (RSSI) as measured by the client and conveyed via an access point with which the UE is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance, and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In some examples, an NMS agent (not shown) runs on UEs 148 and provides telemetry data to NMS 130 from the perspective of UEs 148. The NMS agent allows NMS 130 to receive telemetry data related to the client device experience from the client devices' perspectives, in addition to data already received by NMS 130 from the perspective of an AP through which the client device connects to NMS 130. The NMS agent may also provide device properties of the UE 148 to NMS 130, including operating system (OS) version, modem firmware and software versions, application version running the network agent, and the like. Network connectivity engine 135 of NMS 130 may use artificial intelligence functionality to analyze the received data, identify WiFi connectivity issues, e.g., roaming issues or WiFi vs. cellular, with certain types, versions, or locations of client devices, and generate an action recommending a mitigation action.

In some examples, NMS 130 receives telemetry data from the NMS agent on a particular client device 148, correlates the received telemetry data with a client device identifier, associates the client-side telemetry data with client device location data and other AP-side telemetry data based on the client device identifier, analyzes the client-side telemetry data with respect to the associated AP-side telemetry data to determine one or more location metrics for the wireless network. In this manner, NMS 130 can identify one or more issues or problems with respect to location performance for the wireless network.

In accordance with one or more techniques of the disclosure, network management system (NMS) 100 remotely monitors and/or evaluates location performance in a wireless network, such as wireless networks 102A-102N, based on one or more location metrics. The location metrics may be determined on an AP-level or a site-level, for example. The location metrics may include, for example, a latency metric (location request response time) a jitter or "teleport" metric (location accuracy), a dropped request metric (a percentage of location requests that are handled before drop), an AP uptime metric (a percentage of time one or more APs at the site are not down or unreachable), and a user connect time metric (a length of time users stay connected to location services while associated with a wireless network). Each location metric may further include one or more classifiers. Each of the location metrics and/or their classifiers may include configurable threshold(s) to customize the location metrics for a particular wireless network or customer site. If any of the location metrics or their classifiers do not meet their respective configurable threshold value set for the site, the failure may be attributed to one or more of the classifiers to further understand how and/or why the failure occurred.

The data for the location metrics may include, for example, client-level data received from a client-based software agent (not shown in FIG. 1A) running on UEs 148 as part of a software development kit (SDK). The data for the location metrics may also include client-level location data from a location engine 136 associated with NMS 130. Location engine 136 may receive the data collected by the location applications/SDKs on UEs 148 either directly from the UE or via the APs 142. Location engine 136 generates location data based on the collected data on a per-client device basis. The location data for each of a plurality of UEs 148 for which location determinations are generated by location engine 136 may be stored in a database as location data 139. The location data for each UE includes, for example, an x-y coordinate location of a UE 148 at the site at one or more time periods. NMS 130 aggregates the client-level data and/or the client-level location data on an AP-level or a site-level basis. NMS 130 determines the one or more location metrics based on the aggregated client-level data and/or the aggregated site-level location data.

Based on the location metric(s), NMS 130 may identify anomalies in the location performance of the wireless network, identify a root cause of one or more anomalies in the location performance of the wireless network, and/or automatically invoke one or more remedial actions to address the identified anomalies.

Figure 1B:
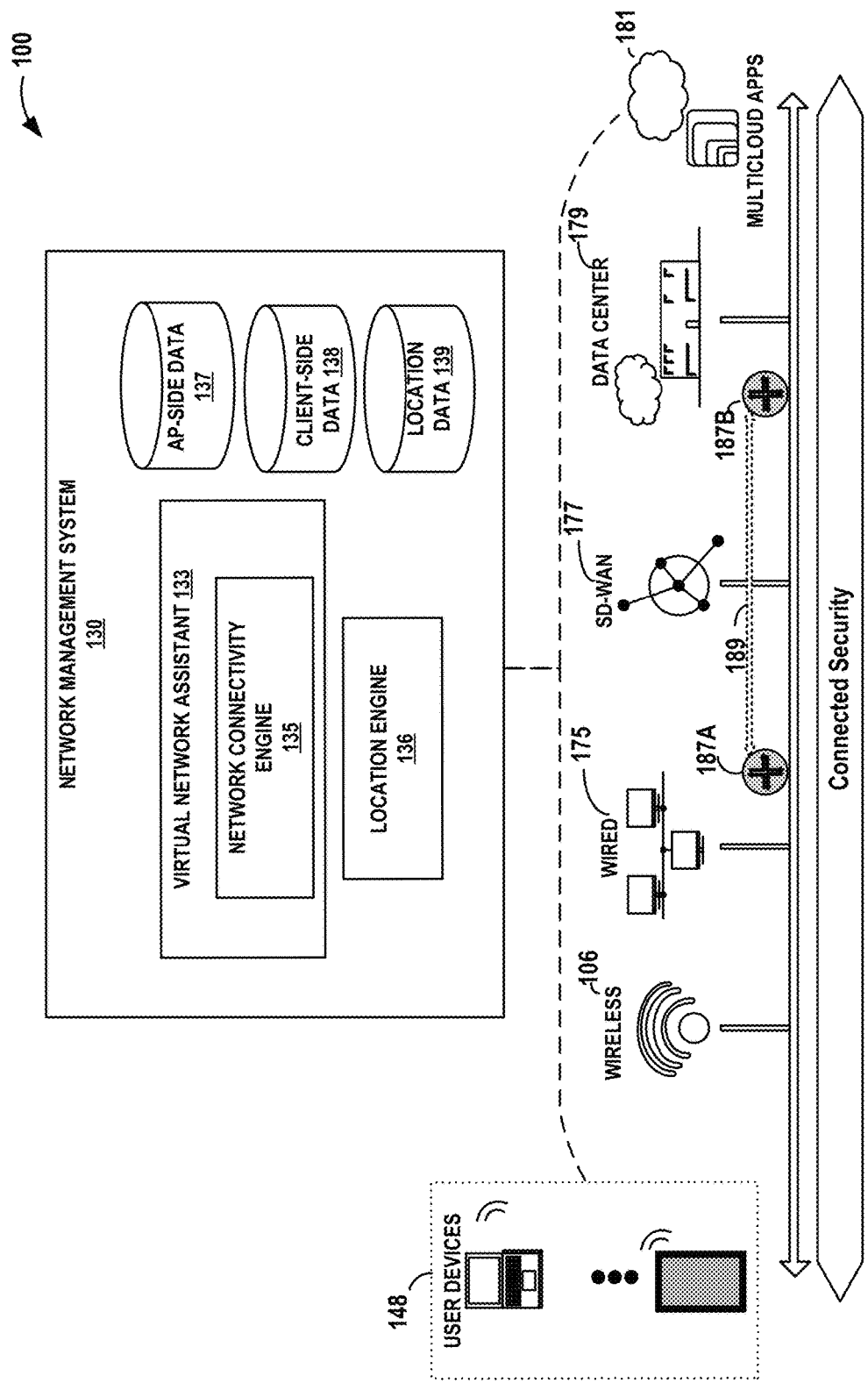
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless networks 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur.

Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

As described above and in accordance with one or more techniques of the disclosure, network management system (NMS) 130 remotely monitors and/or evaluates location performance in a wireless network, such as wireless networks 106, based on one or more location metrics. The location metrics may be determined on an AP-level or a site-level, for example. Each location metric may further include one or more classifiers. Each of the location metrics and/or their classifiers may include configurable threshold(s) to customize the location metrics for a particular wireless network or customer site. If any of the location metrics or their classifiers do not meet their respective configurable threshold value set for the site, the failure may be attributed to one or more of the classifiers to further understand how and/or why the failure occurred.

The data for the location metrics may include, for example, client-level data received from a client-based software agent (not shown in FIG. 1B) running on UEs 148 as part of a software development kit (SDK). The data for the location metrics may also include client-level location data from a location engine 136 associated with NMS 130. Location engine 136 may receive the data collected by the location applications/SDKs on UEs 148 either directly from the UE or via the APs associated with each of the wireless networks 106. Location engine 136 generates location data based on the collected data on a per-client device basis. The location data for each of a plurality of UEs 148 for which location determinations are generated by location engine 136 may be stored in a database as location data 139. The location data for each UE includes, for example, an x-y coordinate location of a UE 148 at the site at one or more time periods. NMS 130 aggregates the client-level data and/or the client-level location data on an AP-level or a site-level basis. NMS 130 determines the one or more location metrics based on the aggregated client-level data and/or the aggregated site-level location data.

Based on the location metric(s), NMS 130 may identify anomalies in the location performance of the wireless network, identify a root cause of one or more anomalies in the location performance of the wireless network, and/or automatically invoke one or more remedial actions to address the identified anomalies.

Figure 2:
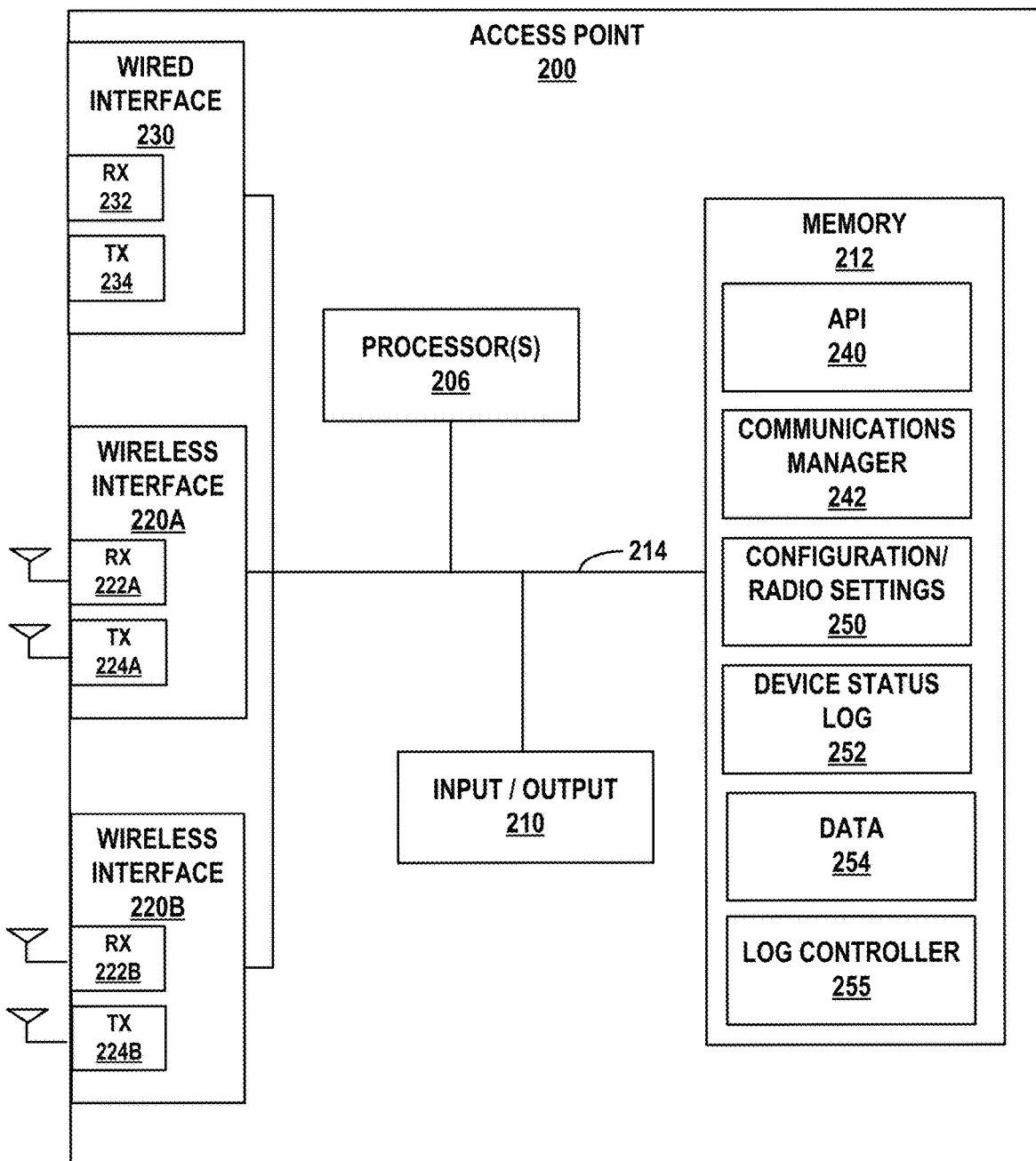
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a WiFi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a WiFi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from UEs 148, such as successful events, failure events, and/or neutral events, that is transmitted by access point device 200 to NMS 130 for cloud-based management of wireless networks 106A by NMS 130.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3A:
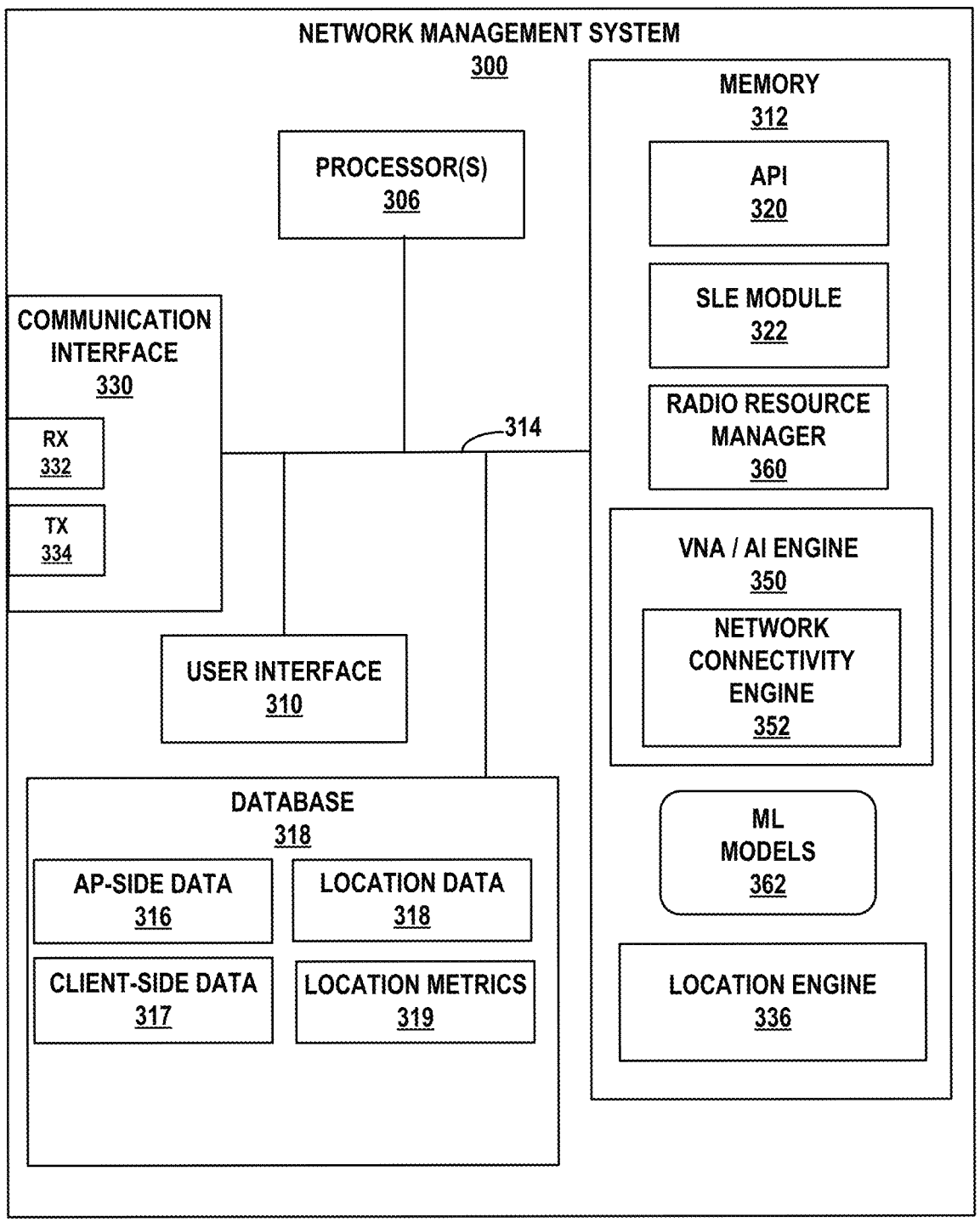
FIG. 3A is a block diagram of an example network management system configured to determine one or more location metrics, in accordance with one or more techniques of the disclosure.

FIG. 3A is a block diagram of an example network management system 300 configured to determine one or more location metrics, in accordance with one or more techniques of the disclosure. In the example of FIG. 3A, NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 and/or from UEs 148, such as network data used to generate one or more events (e.g., successful events and/or failure events), and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, UEs 148, servers 110, 116, 122, 128 and/or any other devices or systems forming part of network 100 such as shown in FIG. 1A. The data and information received by NMS 300 may include, for example, network data and/or event log data received from UEs 148 and AP devices 142 used by NMS 300 to remotely monitor and/or control the performance of wireless networks 106A-106N. Database 318 of NMS 300 may store the network data and/or event log data received from UEs 148 and AP devices 142. NMS may further transmit data via communications interface 330 to any of network devices such as AP devices 142 at any of network sites 102A-102N to remotely manage wireless networks 106A-106N.

Network connectivity engine 352 receives client-side data, including client device properties, from an NMS client agent executing on the client device (UE 148). As one example, network connectivity engine 352 receives a device identifier of the client device from the NMS client agent, such as a universal unique identifier (UUID) of the client device. network connectivity engine 352 can use the device identifier to correlate the client-side data for a particular client device of the plurality of client devices with a device identifier of the particular client device, and associate, based on the device identifier, the client-side data for the particular client device and the AP-side data for the particular client device.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, a location engine 336 and a machine learning model 362. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. In accordance with the techniques described in this disclosure, VNA/AI engine 350 may include a network scope failure detection engine 352 to detect network scope failures and/or identify the root cause of any anomalous or abnormal states. Network connectivity engine 352 may represent an example implementation of network connectivity engine 135 of FIG. 1A. In some examples, the network connectivity engine 352 utilizes artificial intelligence-based techniques and/or machine learning (ML) model 362 to help detect network connectivity issues by evaluating network connectivity events with respect to AP-side data 316 and client-side data 317. Additionally, or alternatively, network connectivity engine 352 utilizes artificial intelligence-based techniques and/or machine learning models 362 to identify whether a particular AP or client device is the root cause of the connectivity issue.

VNA/AI engine 350 may, in some examples, construct, train, apply and retrain supervised and/or unsupervised ML model 362 to event data (e.g., network data 316) to determine whether the collected network event data represents anomalous behavior that needs to be further analyzed by VNA/AI engine 350 to facilitate identification and resolution of faults. VNA/AI engine 350 may then apply the ML model 362 to data streams and/or logs of newly collected data of various network event types (e.g., statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 362 to newly collected data indicates that mitigation is required, VNA/AI engine 350 may identify a root cause of the anomalous system behavior and, if possible, trigger automated or semi-automated corrective action. In this way, VNA/AI engine 350 may construct and apply a ML model 362 based on a particular complex network to determine whether to perform further, resource-intensive analysis on incoming streams of path data collected (e.g., in real-time) from network devices within the complex network system.

In addition, VNA/AI engine 350 may automatically invoke one or more remedial actions intended to address the identified root cause(s) of a connectivity issue. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. In some examples, the remedial actions may also include restarting a server. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

ML models 362 may comprise of different supervised ML models that are applied to AP-side data 316 and client-side data 317. For instance, network connectivity engine 352 may apply a first supervised ML model to AP-side data 316, additionally or alternatively, network scope failure detection engine 352 may apply a second supervised ML model to a second network scope in client-side data 317. Each of the supervised ML models may be configured with one or more parameters (e.g., model labels) to detect network connectivity issues. For example, an ML model for a particular network attribute may include model labels such as a count of clients threshold, count of failure events threshold, duration threshold, and/or roaming threshold. As described further below, network connectivity engine 352 may compare network event data from AP-side data 316 associated with one client device and compare network event data from client-side data 317 for the same client device. By applying ML models 362 to the AP-side data 316 and client-side data 317, network connectivity engine 352 may detect network connectivity issue and/or identify the root cause of connectivity conditions.

In accordance with one or more techniques of the disclosure, NMS 300 remotely monitors and/or evaluates location performance in a wireless network, such as wireless networks 102A-102N, based on one or more location metrics. The location metrics may be determined on an AP-level or a site-level, for example. The location metrics may include, for example, a latency metric (location request response time) a jitter or "teleport" metric (which accounts for sudden changes in reported location due to imperfect estimation algorithms or interrupted communications), a dropped request metric (a percentage of location requests that are handled before drop), an AP uptime metric (a percentage of time one or more APs at the site are not down or unreachable), and a user connect time metric (a length of time users stay connected to location services while associated with a wireless network). Each location metric may further include one or more classifiers. Each of the location metrics and/or their classifiers may include configurable threshold(s) to customize the location metrics for a particular wireless network or customer site. If any of the location metrics or their classifiers do not meet their respective configurable threshold value set for the site, the failure may be attributed to one or more of the classifiers to further understand how and/or why the failure occurred.

The data for the location metrics may include, for example, client-level data received from a client-based software agent (not shown in FIG. 1A) running on UEs 148 as part of a software development kit (SDK). The data for the location metrics may also include client-level location data from a location engine 336 associated with NMS 300. Location engine 336 may receive the data collected by the location applications/SDKs on UEs 148 either directly from the UE or via the APs 142. Location engine 336 generates location data based on the collected data on a per-client device basis. The location data for each of a plurality of UEs 148 for which location determinations are generated by location engine 336 may be stored in a database as location data 318. The location data for each UE includes, for example, an x-y coordinate location of a UE 148 at the site at one or more time periods. NMS 300 aggregates the client-level data and/or the client-level location data on an AP-level or a site-level basis. NMS 300 determines the one or more location metrics based on the aggregated client-level data and/or the aggregated site-level location data. The determined location metrics may be stored in database 318 as location metrics 319.

Based on the location metric(s), NMS 300, implementing, for example, VNA/AI engine 350, may identify anomalies in the location performance of the wireless network, identify a root cause of one or more anomalies in the location performance of the wireless network, and/or automatically invoke one or more remedial actions to address the identified anomalies.

Figure 3B:
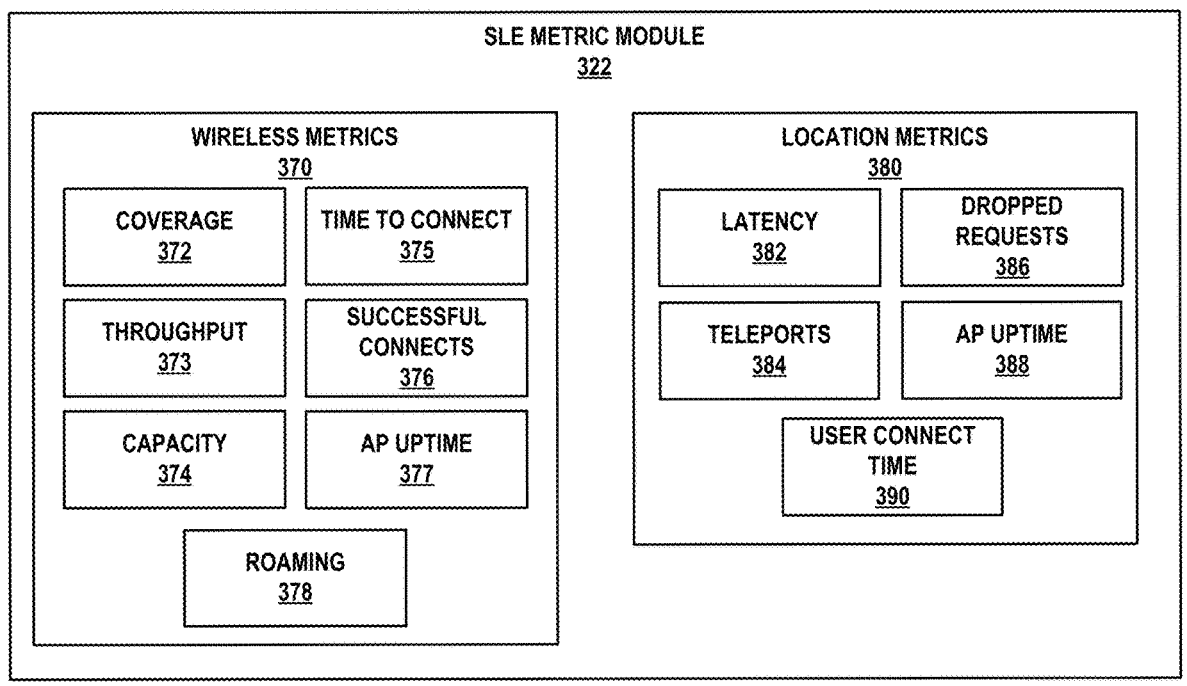
FIG. 3B is a block diagram illustrating further example details of a SLE metric module of the network management system from FIG. 3A.

FIG. 3B is a more detailed block diagram of SLE module 322. SLE module 322 includes one or more modules for determining one or more location metrics and/or one or more wireless SLE metrics. In this example, the wireless SLE metric module 370 include a roaming metrics module 378, a coverage metric module 372, a throughput metric module 373, a capacity metric module 374, a time to connect module 375, a successful connects module 376 and an AP health module 377. SLE module 322 may include some or all of these modules and may also include other modules for determination of other wireless network performance metrics.

In accordance with one or more techniques of the disclosure, example location metric module 380 includes one or more of a latency module 382, a teleports module 384, a dropped requests module 386, an AP uptime module 388, and a user connect time module 390.

Latency module 382, when executed by one or more processors such as processors 306 of FIG. 3A, determines the latency (i.e., response time) of each individual location request; that is, latency module 382 determines the latency of each individual location request from an individual client device as opposed to the time between each individual location request. "Latency" measures the amount of time between issuance of the location request by the client device and receipt of the determined location by the client device. In some examples, the latency threshold is a configurable value that may be set by a network administrator or location services provider. For example, the latency threshold may be a configurable value between 200 ms to 2000 ms, with a default threshold of 1000 ms.

The latency metric module 382 may further determine one or more classifiers for the latency metric. The latency classifiers further identify one or more reasons why location request(s) for wireless client devices associated with the wireless network fail to meet the configurable latency threshold. For example, the latency classifiers may include:
  (1) Service Interruption: defined by the connection speed for the given connected client (excludes the client's local network speed).
  (2) Slow Network: defined by the (local) network speed received by the client (excludes the cloud connection speed).
  (3) Cellular: the cellular latency metric may be tagged if the wireless client device is using a cellular connection when high latency occurs, indicating a possible correlation between cellular connection/reception and the failure to meet the latency threshold.
  (4) WiFi: the WiFi latency metric may be tagged if the wireless client device is using WiFi when high latency occurs, indicating a possible correlation between the WiFi connection/reception and the failure to meet the latency threshold.

Teleports module 384, when executed by one or more processors such as processors 306 of FIG. 3A, identifies teleport events, defined as when a distance between subsequent reported locations meets or exceeds a configurable threshold. For example, the system may periodically update the reported location of a client device (e.g., on the order of once per second). When a reported location differs from a previously reported location by at least the configurable threshold, a teleport event is deemed to have occurred. For systems in which the location of a client device is updated once per second, the period of time expectation would be on the order of 1-2 seconds.

Teleports module 384 further determines the number of teleport events occurring over a selected period of time and/or the percentage of teleport events occurring over a selected period of time. In this way, the teleport metric accounts for sudden changes in reported location due to, for example, imperfect estimation algorithms or interrupted communications. In some examples, the teleports threshold is a configurable value that may be set by a network administrator or location services provider. For example, the teleports threshold may be a configurable value between 0-3 meters, with a default threshold of 3 meters.

The teleports metric module 384 may further determine one or more classifiers for the teleports metric. The teleports classifiers further identify one or more reasons why location request(s) for wireless client devices associated with the wireless network fail to satisfy the configurable teleports threshold. For example, the teleports classifiers may include:
  (1) Beacon Density: defined when the beacon count appears low relative to the norm of what an SDK client should detect given the number of APs at the site. In some examples, the Beacon Density classifier tends to be equal (or close to equal) to the beam density classifier (see below).
  (2) Device Sensor: defined based on the motion value the SDK client sends to the NMD 130/300, and indicative that the device motion sensor may be out of calibration (e.g. could be compass, accelerometer, gyroscope, motion detector)

(3) Virtual BLE (vBLE) Placement: defined when AP placement is causing a determined wireless client location to teleport or alternate between 2 different locations. This may occur when the AP placement is causing "mirroring" or "multiple peaks" in the RSSI-based location probability surface.

(4) Beam Density: defined when the beam count appears low relative to the norm of what an SDK client should detect given the number of APs on the map/site. In some example, the Bean Density classifier tends to be equal to the Beacon Density classifier (see above).

(5) Weak RSSI: defined when the wireless client device significantly moves out of range from locating APs on the map/site, resulting in a weak (averaged RSSI) signal across the APs.

(6) Machine Learning: defined when the machine learned value for a path loss function parameter (PLE+INT sum) for the given client device type (e.g., iPhone 7, iPad Mini, Samsung Galaxy 5, Moto E, etc.) changes significantly (e.g., +/−2 dBm)

Dropped requests module 386, when executed by one or more processors such as processors 306 of FIG. 3A, identifies dropped request events that occur when requests for location from the wireless client agent were dropped, causing issues with location accuracy. In some examples, the dropped requests threshold is a configurable value that may be set by a network administrator or location services provider. For example, the dropped requests threshold may be a configurable value between 0-30 pending requests, with a default threshold of 3 pending requests.

The dropped requests metric module 386 may further determine one or more classifiers for the dropped requests metric. The dropped requests classifiers further identify one or more reasons why location request(s) for wireless client devices associated with the wireless network fail to meet the configurable dropped requests threshold. For example, the dropped requests classifiers may include:

(1) Client Requests Timeout: Due to slow network the client request was not able to get a corresponding response within a predetermined period of time (established by a configurable threshold).

(2) Pending Requests: defined when the client requests being potentially timed out is greater than the pending requests threshold. The metric should not trigger when the threshold is 0.

(3) Dropped by Network: defined when a mismatch of the dropped request count as tracked by the NMS 130/300 vs. the SDK client reported value (since SDK client tracks itself, when there's discrepancy, we assume the request got dropped somewhere along the network and not by the SDK itself).

(4) Cellular: the cellular dropped requests metric may be tagged if the wireless client device is using a cellular connection when dropped packets occur, indicating a possible correlation between cellular connection/reception and the failure to meet the latency threshold.

(5) WiFi: the WiFi dropped requests metric may be tagged if the wireless client device is using WiFi when dropped packets occur, indicating a possible correlation between the WiFi connection/reception and the failure to meet the latency threshold.

(6) Reconnects: defined when a client attempts a reconnection to the NMS 130/300 cloud for a location request. For example, an SDK client agent may present popup notifications about re-establishing a connection when there are connectivity issues. Reconnects are a likely indicator that some packet loss has occurred.

(7) Offline: this metric defined when data from the client to the NMS 130/300, after the occurrence, tells us that there was no internet connectivity for some specified duration. For example, the client device may have gone into airplane mode for a while, lost WiFi or cellular data connection for a specified period of time before gaining it back, while still using the client app/SDK, such as going through a hallway or section of a building with bad WiFi/cellular coverage. Detection of a wireless client being offline and then back online is a likely indicator of some packet loss.

(8) Not Uniform Requests: defined based on client location request timestamps that the location requests are coming in too quickly (e.g., 700 ms or less) or too slow (e.g., 1.3 seconds or more) between requests. This will likely indicate potential issues as the requests are not in the ideal time increments (e.g., about 1 second in some examples) for optimal location determination.

AP uptime module 388, when executed by one or more processors such as processors 306 of FIG. 3A, identifies events affecting the amount or percentage of time that APs at a site are operational. The AP uptime metric module 388 may further determine one or more classifiers for the AP uptime metric. The AP uptime classifiers further identify one or more reasons why location request(s) for wireless client devices associated with the wireless network fail to satisfy the configurable AP uptime threshold. For example, the AP uptime classifiers may include:

(1) AP Reboots: the AP Reboot classifier tracks the number of AP reboots on an individual AP basis and a site-wide basis.

(2) AP Unreachable: AP Unreachable is when an AP loses connectivity to NMS 130/300. This can be due to a WAN issue, or when the AP is unplugged from the switch.

(3) Switch Down events: Switch Down events occur when one or more switches providing connectivity for a site are unreachable.

(4) Site Down events: Site Down events occur when all APs on a site are unreachable.

The user connect time module 390, when executed by one or more processors such as processors 306 of FIG. 3A, determines a user connect time metric that tracks how long SDK agent wireless client devices stay connected to use location services (e.g., 1 minute, 5 minutes, 30 seconds, etc.). In some examples, this metric is supplemented with location analytics for how long a client is associated with the site, is present within a defined zone at the site, etc. The user connect time threshold may be a configurable value between 0 and 600 seconds (10 minutes), with a default threshold of 60 seconds of minimum connect time/usage. The threshold is based on a minimum connect time or usage, so the user connect time metric is flagged/classified if the monitored user connect time is below the configurable threshold.

In one example, to determine the user connect time metric for SDK clients, user connect time module 390 periodically polls for SDK client connect times (e.g., every 300 seconds (5 minutes)), and also periodically expires inactive SDK clients from the cache (e.g., every 300 seconds). A new SDK client detected by the poll will be added to the cache, with it's first "seen" time is logged. Each time the client is detected, the last seen time is updated. At the poll interval, for clients that have not expired out of cache, user connect time module 390 computes the durations the client has stayed connected by determining a difference of last and first seen times. Any SDK clients that fall below the threshold are classified/flagged. Note that in this example an SDK client's connect time can span multiple histogram bucket values from 1st bucket (zero) through the highest duration the client was connected, due to the nature of the poll/check connect time durations.

In some examples, the latency score for each roaming event, the suboptimal roam score for each roaming event, and/or the sticky client score for each client device may be assigned based on empirical observations or measurements of wireless network behavior. In other examples, location metric module 380 may automatically generate and train one or more supervised and/or unsupervised machine learning (ML) models (such ML models 362) to determine one or more location metrics based on network data (e.g., client-side data, AP-side data, and/or location data) extracted from historically observed data and/or statistics for the wireless network.

Figure 4:
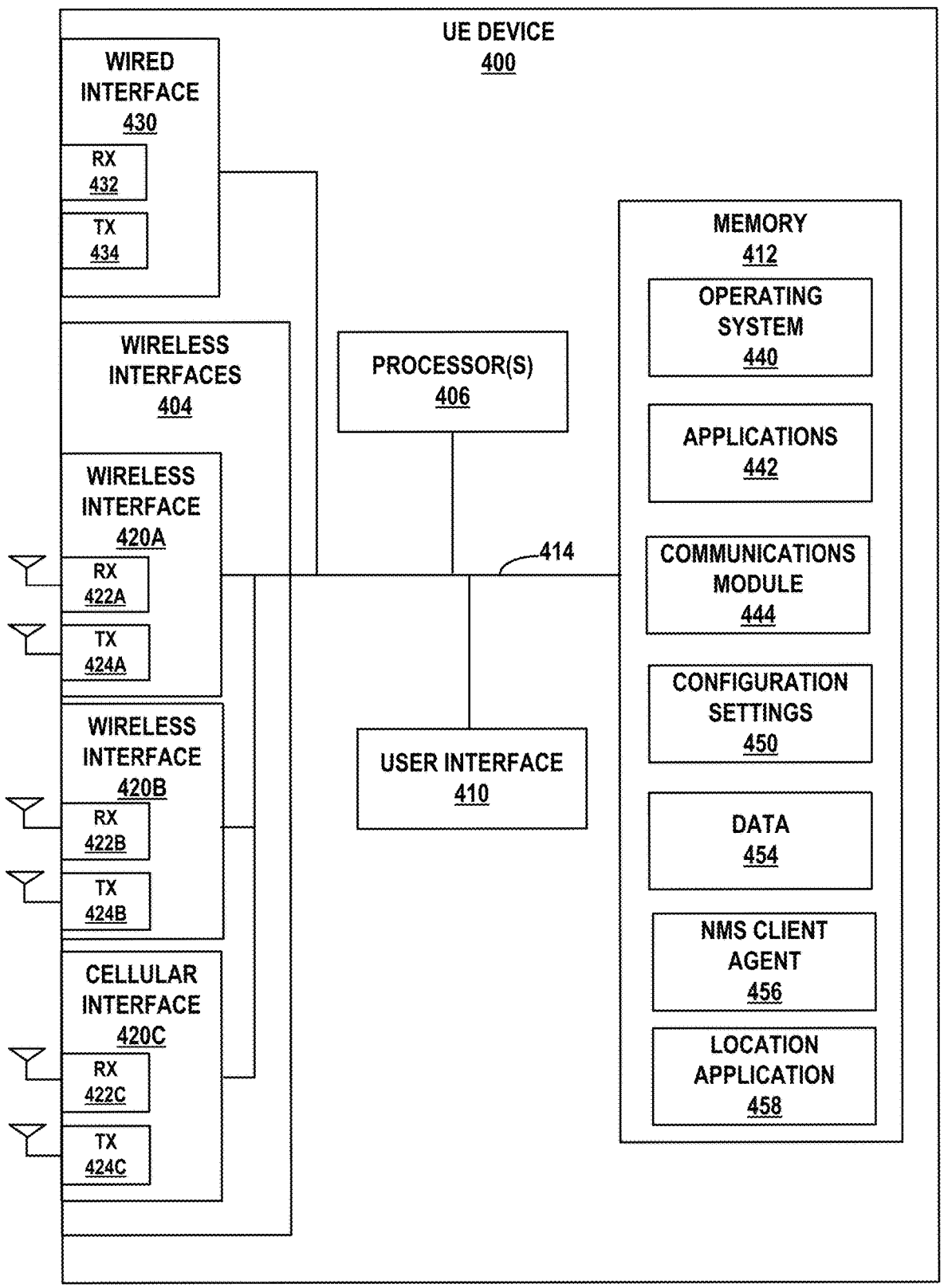
FIG. 4 is a block diagram of an example user equipment (e.g., wireless client) device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

Network data may be stored in UE memory 412 as network data 454 and transmitted to NMS 130/300 via one or more AP devices 142 in the wireless network. In some examples, NMS 130/300 receives data directly from UEs 148 not via AP devices 142. For example, NMS 130/300 receives network data from UEs 148 in networks 106A-106N of FIG. 1A. In some examples, NMS 130/300 receives relevant network data from UEs 148 on a continuous basis (e.g., every 2 seconds, 30 seconds, 40 seconds, or other appropriate time period), and NMS may determine the connection status of each UE to the network. The network data 454 may include, for example, a log of one or more UE associated events or states (e.g., failure event, successful event, neutral event, etc.), and any other data or event relevant for determination of the connection status of the UE.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1A. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1A, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1A, AP device 200 of FIG. 2, other UEs 138 and/or other devices configured for wireless communication. In some examples, first wireless interface 420A may include a WiFi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 130/300). Data storage for network data 454 may store any data used and/or generated by UE 400, such as network data used to determine connection status of the UE to the network, that is collected by UE 400 and transmitted to any of AP devices 138 in a wireless network 106 for further transmission to NMS 130.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

NMS client agent 456 is a software agent of NMS 130/300 that is installed on UE 400. In some examples, NMS client agent 456 can be implemented as a software application running on UE 400. For example, NMS client agent 456 collects information including detailed client-device properties from UE 400, including insight into UE 400 roaming behaviors. The information provides insight into client roaming behavior because roaming is a client device decision. In some examples, NMS client agent 456 may display the client-device properties on UE 400. NMS client agent 456 sends the client device properties to NMS 130/300 either directly or via an AP device with which UE 400 is associated. NMS client agent 456 can be integrated into a custom application, or as part of location application 458, e.g., via mobile device management (MDM). NMS client agent 456 may be configured to recognize device connection types (e.g., cellular or WiFi), and determine the corresponding signal strength (e.g., received signal strength indicator or RSSI) of the received wireless signal. For example, NMS client agent 456 recognizes access point connections and their corresponding wireless signal strengths as received by UE device 400. NMS client agent 456 can store information specifying the APs recognized by UE 400 as well as their corresponding wireless signal strengths. NMS client agent 456 or other element of UE 400 also collects information about which APs the UE 400 is or was associated with and/or which APs the UE 400 is or was not associated with. NMS client agent 456 of UE 400 sends this information to NMS 130/300 via its associated AP (that is, the AP with which the UE 400 is wirelessly communicating with). In this manner, UE 400 sends information about not only the AP that UE 400 is associated with, but also information about other APs that UE 400 recognized and did not connect with, and the received signal strengths of their respective wireless signals. The AP in turn forwards this information to the NMS, including the information about other APs the UE 400 recognized besides itself. This additional level of granularity enables NMS 130/300, and ultimately network administrators, to better determine the WiFi experience directly from the client device's perspective.

In some examples, NMS client agent 456 further enriches the client device data leveraged in service levels. For example, NMS client agent 456 may go beyond basic fingerprinting to provide supplemental details into properties such as device type, manufacturer, and different versions of operating systems. In the detailed client properties, the NMS 130/300 can display the Radio Hardware and Firmware information of UE 400 received from NMS client agent 456. The more details the NMS client agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain wireless clients or certain types of wireless clients.

NMS client agent 456 enables NMS 130/300 to have a client-level view of the network, capturing events directly from UE device 400 and providing network visibility inside out, from the wireless client device's perspective. In addition to the rich visibility of the device's WiFi experience, an administrator can now understand how the wireless client device interacts with the WiFi environment.

In some examples, NMS client agent 456 may cause user interface 410 to display a prompt that prompts an end user of the UE 400 to enable location permissions before NMS client agent 456 is able to report the device's location, client information, and network connection data to the NMS. NMS client agent 456 will then start reporting client-side data to the NMS and/or location data from location application 458. In this manner, the end user of the client device can control whether the NMS client agent 456 is enabled to report client device information to the NMS.

Figure 5:
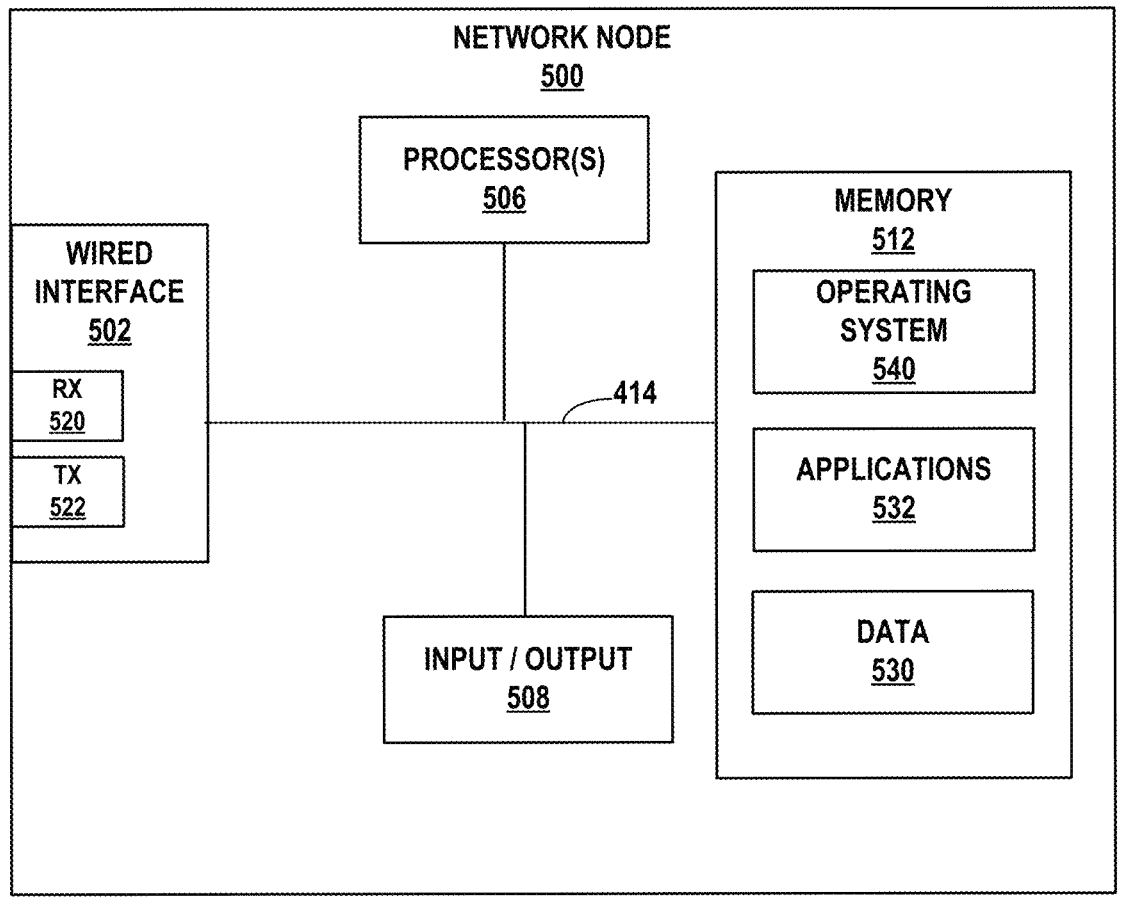
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1A, e.g., router, switch, AAA server 110, DHCP server 116, DNS server 122, VNA 133, web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data for node 500 and/or other devices, such as wireless access points, based on a logging level according to instructions from the network management system. Network node 500 may, in some examples, forward the network data to a network management system (e.g., NMS 130 of FIG. 1A) for analysis as described herein.

Figure 6:
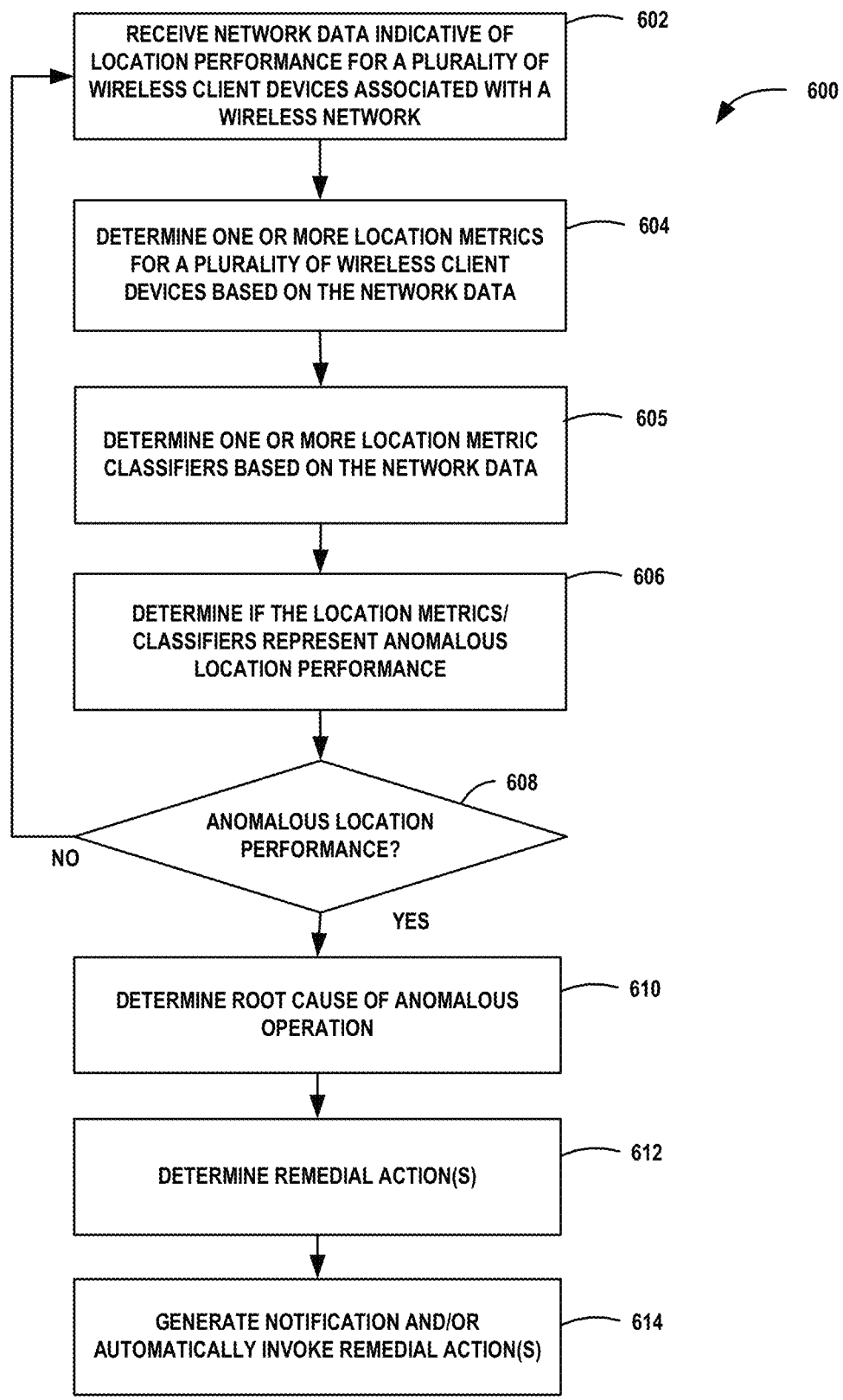
FIG. 6 is a flowchart of an example process by which a network management system determines whether one or more location metrics associated with a wireless network represent degraded location performance in accordance with one or more techniques of the disclosure.

FIG. 6 is a flowchart of an example process (600) by which a network management system, such as NMS 130 and/or 300, determines whether one or more location metrics represent anomalous location performance in accordance with one or more techniques of the disclosure. The NMS receives data indicative of location performance for a plurality of wireless client devices associated with a wireless network (602). The data may include, for example, client-level data received from a client-based software agent running on wireless client device(s) as part of a software development kit (SDK), client-level location data from a location engine associated with the NMS, and/or one or more location metrics associated with location requests issued by a plurality of wireless client devices associated with the wireless network.

The NMS determines one or more location metrics indicative of location performance in the wireless network (604). For example, the location metrics may include one or more of a latency metric, a teleports metric, a dropped requests metric an AP uptime metric and/or a user connect time metric. For at least one of the location metrics, the NMS further determines one or more which further identify a potential cause for any detected location degradation (605).

The NMS determines if one or more of the location metrics and/or associated classifiers represent a degradation in location performance (606). For example, the NMS may apply a trained machine learning model to classify location performance based on historical data. The trained machine learning model may classify location performance as normal or expected operation or as one or more classifications of anomalous (e.g., degraded) operation depending, for example, on which of the location metrics and/or classifiers represent a degradation in location performance and/or the relative severity of the degradation.

If NMS determines that one or more location metrics and/or classifiers do not represent a degradation in performance (e.g., the location performance satisfies all of the location metric configurable thresholds) (NO branch of 608), the NMS continues to monitor the data during operation of the wireless network for a location performance degradation (602, 604, 605, 606). In some examples, if the NMS determines that the one or more location metrics and/or classifiers represent a location degradation (YES branch of 608), the NMS may further determine one or more root causes of the location degradation (610). In some examples, to determine a root cause of the location degradation (610), the processor(s) may refer to root cause association data stored in a database, such as database(s) 312 as shown in FIG. 3A. Root cause association data 60 may include, for example, one or more database structures that associate classification(s) of location degradation with one or more potential root causes. In other examples, to determine a root cause of the location degradation (610), the NMS may invoke a virtual network assistant (VNA), such as VNA engine 350 as shown in FIG. 3A, to invoke a more complex and/or computationally expensive root cause analysis.

The NMS may further determine one or more remedial actions to address the root cause(s) of the location degradation (612). In some examples, to determine a remedial action to address a root cause of the location degradation (612), the NMS may refer to root cause association data stored in database, such as database(s) 312 as shown in FIG. 3A. The root cause association data may include, for example, one or more database structures that associate classification(s) of a location degradation with one or more potential root causes, and further that associate each root cause with one or more remedial actions that may be suggested and/or automatically invoked to address the respective root cause. In other examples, to determine remedial action to address a root cause of a location degradation (612), the processor(s) may invoke a virtual network assistant (VNA), such as VNA 350 as shown in FIG. 3A, to invoke a more complex and/or computationally expensive root cause/remedial action analysis.

The NMS may further generate a notification including an indication of the one or more roaming quality assessments, an indication of any anomalous operation and/or anomalous operation classification, one or more root causes of the anomalous operation, and/or one or more remedial actions to address the root cause(s) of the anomalous operation (614). In some examples, the NMS may further automatically invoke one or more of the determined remedial actions to address the determined root causes of the anomalous operation of the wireless network (614). The NMS may continuously repeat process (600) for the wireless network and update the roaming quality assessments, monitor for anomalous network behavior, determine root cause(s) of anomalous behavior and automatically perform remedial actions to address the anomalous behavior on a continuous basis.

Figure 7:
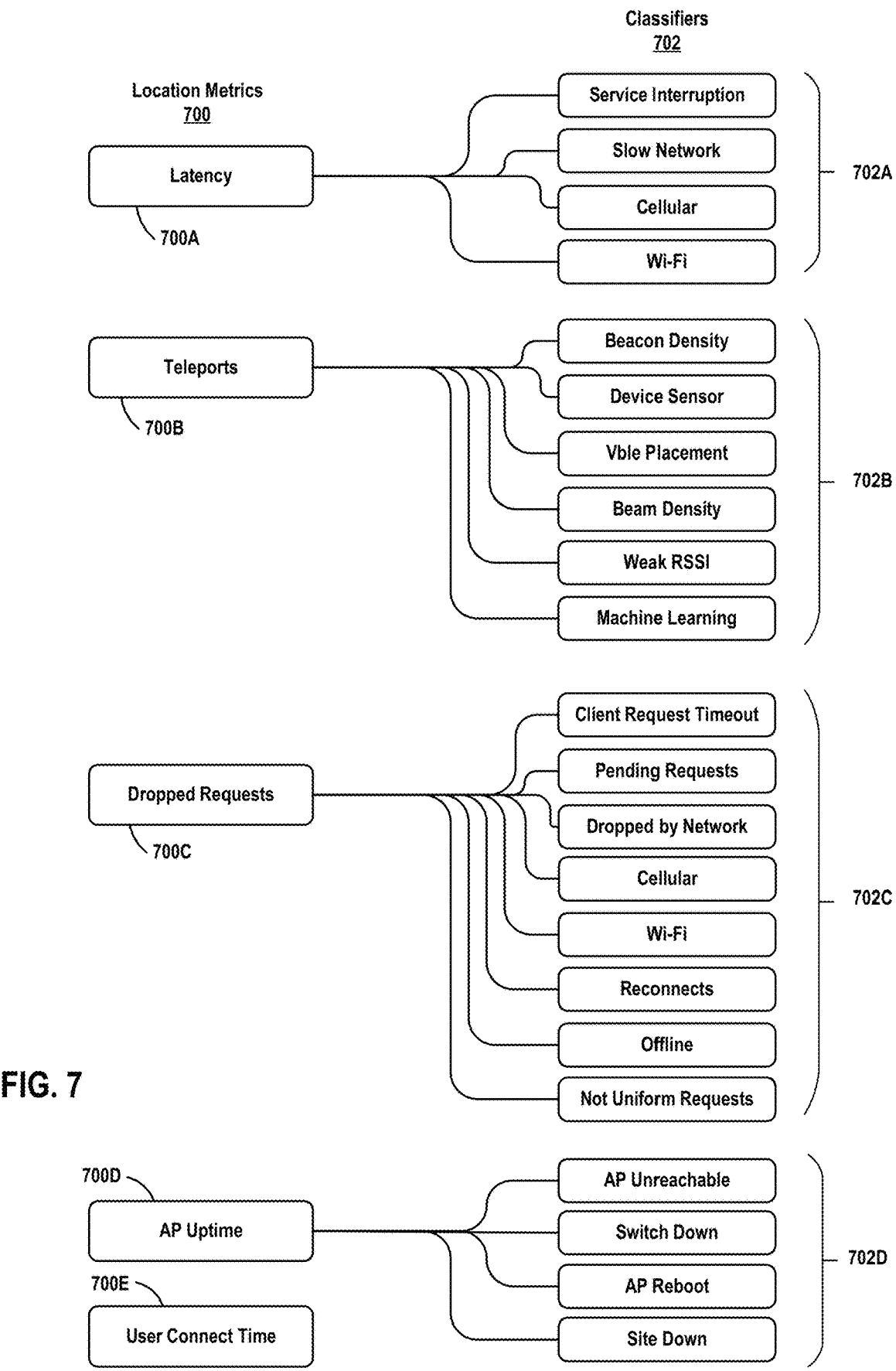
FIG. 7 shows an example hierarchy of one or more example location metrics and their respective classifiers in accordance with one or more techniques of the disclosure.

FIG. 7 shows an example user interface including user interface elements 700A-700E and 702A-702D representing a hierarchy of example location metrics and example classifiers. In some examples, NMS 130/300 generates data representative of selectable user interface elements for one or more location metrics 700 and one or more location metric classifiers 702 for display. Upon selection of any of location metric user interface elements 700A-700E, NMS 130/300 may enable selection of one or more classifier user interface elements 702A-702D corresponding to the selected location metric.

FIGS. 8A-8G illustrate example user interfaces that may be displayed with respect to one or more location metrics, in accordance with one or more techniques of the disclosure.

Figure 8A:
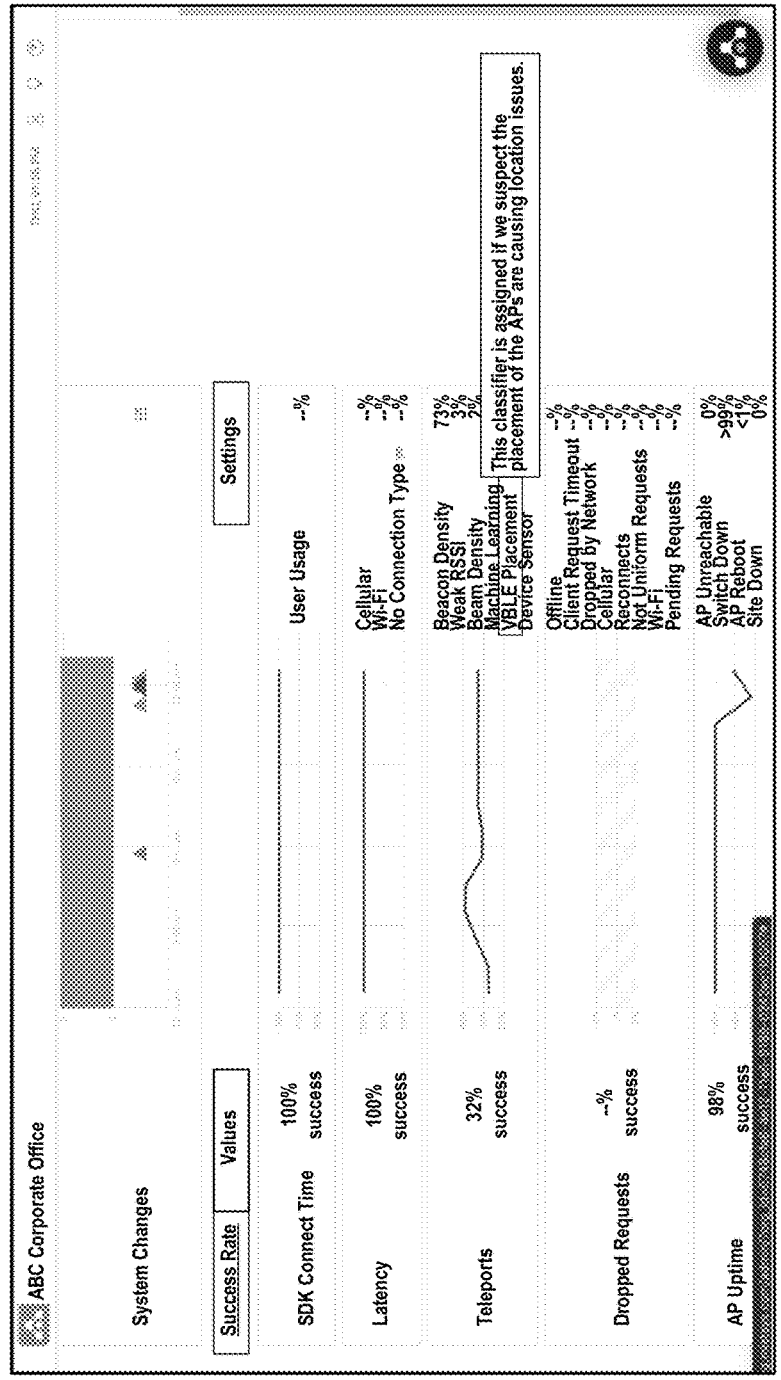
FIGS. 8A-8G illustrate example user interfaces with respect to one or more location metrics, in accordance with one or more techniques of the disclosure.

FIG. 8A is an example user interface illustrating an example location metric home screen 800 for a site, "ABC Corporate Office." In FIG. 8A, the "Success Rate" tab has been selected. This causes the user interface to display a list of each location metric including the success rate for all location requests during a selected period of time. Percentage values in the location metrics (or alternative non-percentage numeric view) provide a sense of performance on different aspects of location in terms of the location metrics with less than 100% considered a degradation. Where not applicable percentage values are omitted (no data, no degradation). For example, for the latency metric, user interface 800 indicates that 100% of the location requests for the selected period of time were successful. In other words, 100% of the location requests by wireless client devices at the site "ABC Corporate Office" were successfully completed within the configurable (or default) latency threshold. For the teleports metric, user interface 800 indicates that 32% of the location requests for the selected period of time were successful. In other words, 32% of the location requests by wireless client devices at the site "ABC Corporate Office" satisfied the teleports threshold.

User interface 800 further lists the classifiers corresponding to each location metric and the success rate for each classifier. The classifiers are only flagged if there is a degradation detected with respect to the respective location metric. In the example of FIG. 8A, for the latency metric, because 100% of the location requests were successful, the classifiers are not flagged as there was no location degradation with respect to latency. For the teleports metric, the teleports classifiers indicate that beacon density was flagged for 73% of the degraded location requests, weak RSSI was flagged 3% of the degraded location requests, beam density was flagged for 2% of the location requests, etc.

Hovering a mouse pointer a classifier on the location metric home screen causes the user interface to display information on either (1) suggested remedial actions that a network administrator can perform to attempt to correct the location degradation, or (2) suggested causes for the location degradation in cases that are not customer correctable. In FIG. 8A for example, hovering the mouse pointer over the "vBLE Placement classifier caused the user interface to display the information "This classifier is assigned if we suspect the placement of the APs are causing location issues."

Figure 8B:
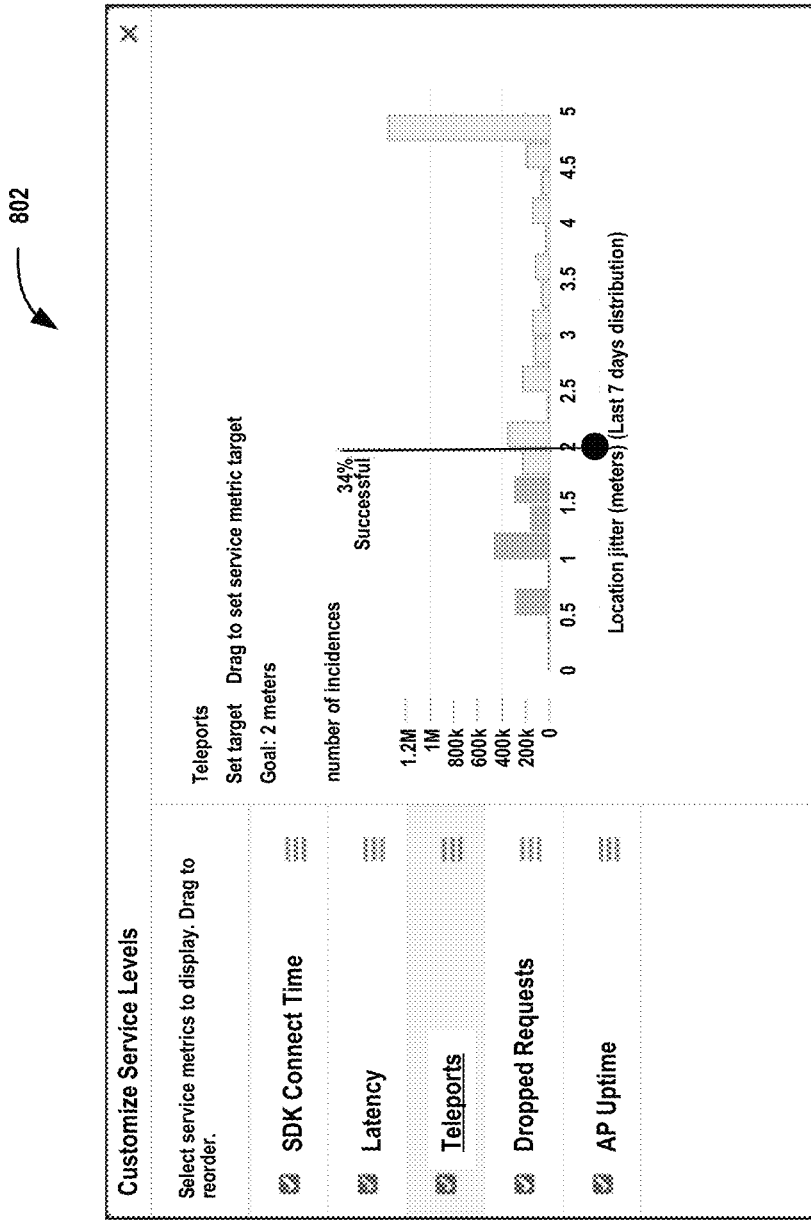

FIG. 8B is an example user interface 802 illustrating an example location metric home configurable threshold home screen. User interface 802 displays historic values, if available, for customer to use as a gauge for where to appropriately set the threshold. In the example of FIG. 8B, the configurable threshold home screen for the teleports metric is displayed. The historic values for the number of incidences in which the teleports metric was flagged for the last 7 days are shown. Similar screens would be displayed with respect to the other location metrics and associated historic data would be displayed. This data may assist a network administrator in selecting an appropriate threshold for the teleport metric. Similar screens for the other location metrics may also be selected and displayed, and historical data for those location metrics displayed to assist with setting of the respective configurable thresholds.

Figure 8C:
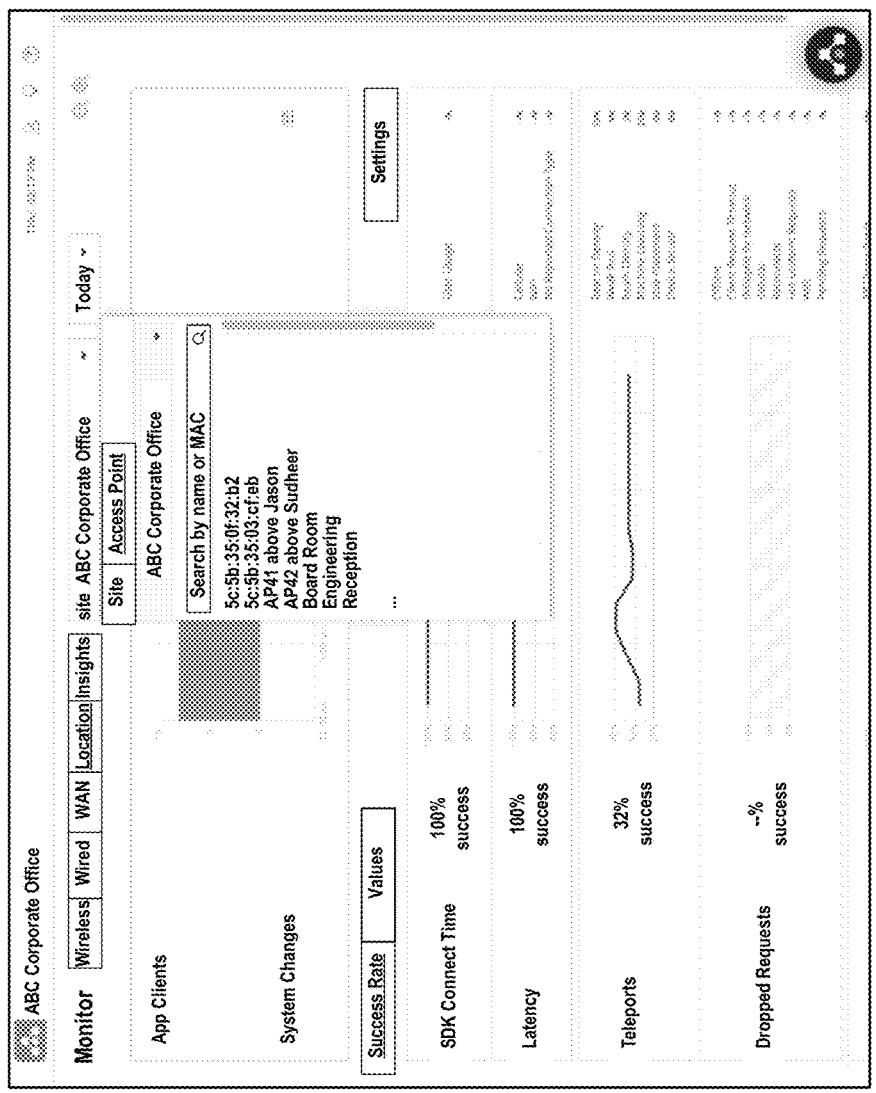

FIG. 8C is an example user interface 804 illustrating an example home screen for the site, "ABC Corporate Office." User interface 804 includes user selectable tabs "Wireless," "Wired," "WAN," "Location," and "Insights," by which a user may view the metrics and underlying data associated with the selected tab. In user interface 804, the "Location" tab has been selected, causing user interface 804 to display a location metric home screen. IN addition, the tab "Access Point" has also been selected, causing user interface 804 to display a list of access points on the site, from which a user may select in order to view location data associated with the selected access point.

Figure 8D:
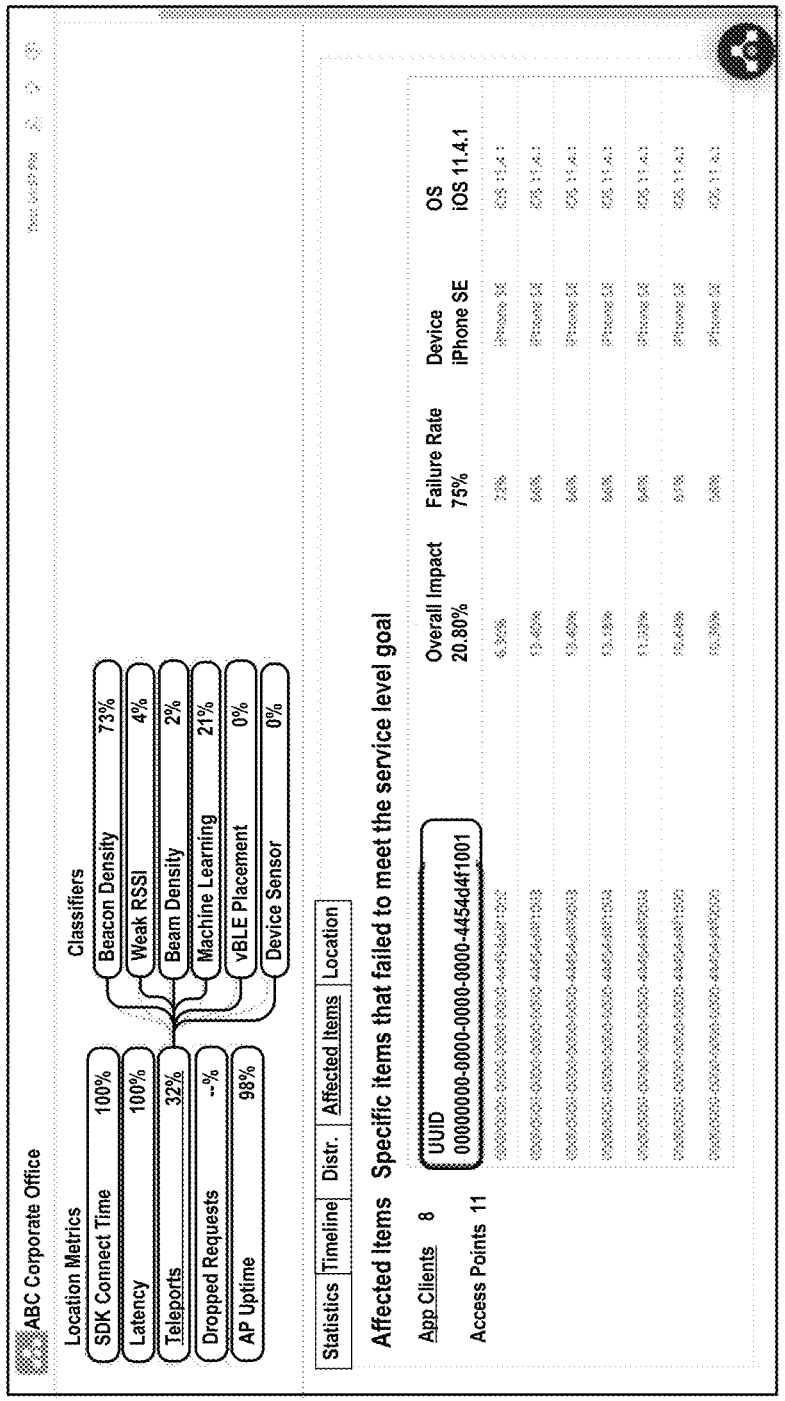

FIG. 8D is an example user interface 806 illustrating an example location metric home screen. In user interface 806, the teleports metric user interface element has been selected in the location metric hierarchy, causing user interface 806 to display user interface elements corresponding to the teleports classifiers. User interface 806 also includes user selectable tabs "Statistics," "Timeline," "Distribution," "Affected Items," and "Location" for which the tab, "Affected Items" has been selected. User interface 806 displays a list of affected clients with their identifiers, thus indicating which wireless client devices are having problems with a particular location metric or classifier.

Figure 8E:
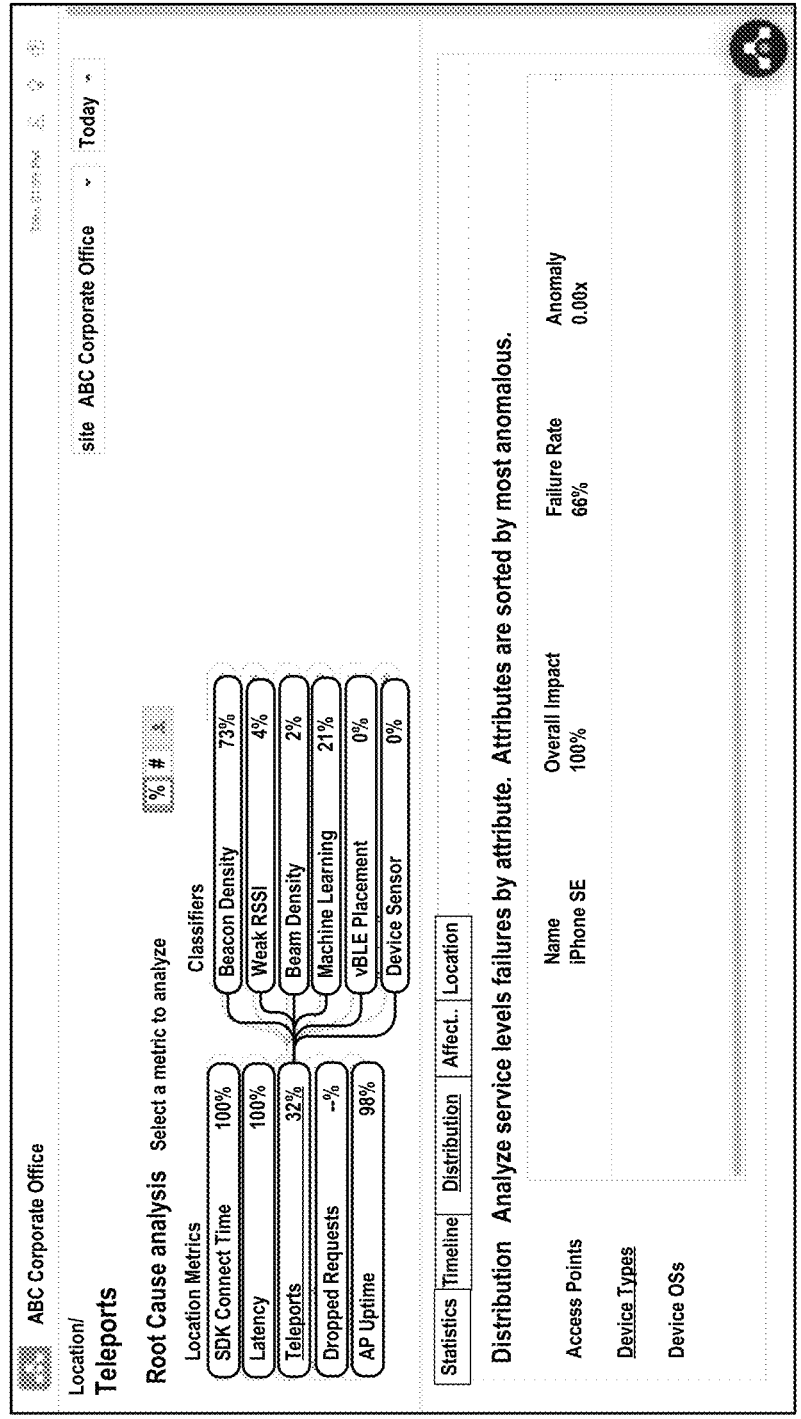

FIG. 8E is an example user interface 808 illustrating an example root cause analysis screen for the teleports metric. The "Distribution" tab and "Device Types" have been selected, causing user interface 808 to display that, in this example, the device type "iPhone SE" was responsible for 100% of the location degradation with respect to the teleports metric, and that 66% of the location requests issued by this device type experienced a location degradation.

Figure 8F:

FIG. 8F is an example user interface 810 illustrating another example root cause analysis screen for the teleports metric. in user interface 810, the "Distribution" tab and "Access Points" have been selected, causing user interface 810 to display a list of access points at the site, "ABC Corporate Office" and the overall impact of each access point to the teleports metric.

Figure 8G:
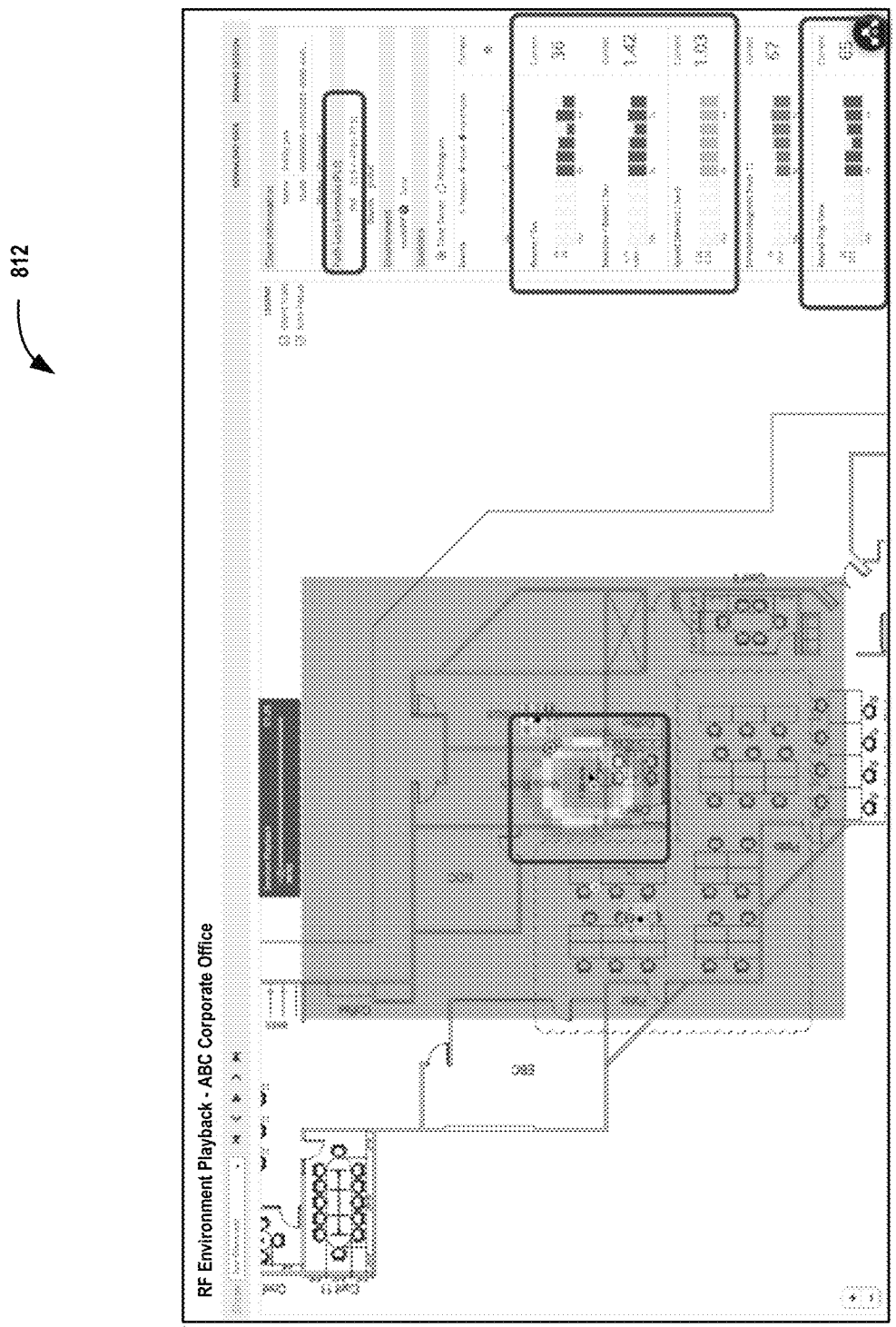

FIG. 8G is an example user interface 812 illustrating an example RF Environment view including data from the location metrics (shown in the right side of user interface 812). In this example, the shared or overlapping data shown above include the PLF, beam & beacon count, speed (or rather "velocity"), and round trip time (or rather "latency"). In this example, the data is not highlighted as problematic or not; rather, it is up to the user to discern whether the data indicates a degradation with respect to location performance. The circled multi-color area on the map indicates part of the RF surface map information.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks— Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), WiFi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a WiFi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

Definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth to provide a thorough understanding of the present techniques. However, the present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing the ability to diagnose and remedy network issues. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
   a plurality of access points (APs) configured to provide a wireless network at a site; and
   a network management system comprising:
   a memory configured to store client-side data collected by a plurality of client devices associated with the wireless network and location data associated with each of the plurality of client devices generated in response to location requests, issued by the plurality of client devices, for a location service provided to the plurality of client devices; and
   one or more processors coupled to the memory and configured to determine, based on at least one of the client-side data or the location data, one or more location metrics associated with the location requests issued by the plurality of client devices, wherein the one or more location metrics are indicative of whether the location requests satisfy a threshold indicative of a performance of the location service provided to the plurality of client devices.

2. The system of claim 1, wherein the client-side data includes received signal strength indicators (RSSI) for each of a plurality of wireless signals received by the plurality of client devices from the plurality of APs.

3. The system of claim 1, wherein the one or more location metrics include a latency metric indicative of a percentage of location requests satisfying a latency threshold.

4. The system of claim 3, wherein the latency metric further includes a service interruption classifier, a slow network classifier, a cellular classifier and a WiFi classifier.

5. The system of claim 1, wherein the one or more location metrics include a dropped requests metric indicative of a percentage of location requests that were dropped due to a number of pending requests exceeding a pending requests threshold.

6. The system of claim 5, wherein the dropped requests metric includes a pending requests classifier, a reconnects classifier, and a not uniform requests classifier.

7. The system of claim 1, wherein the one or more location metrics include a teleports metric indicative of a percentage of location requests in which a deviation from a previous determined location exceeds a teleports threshold.

8. The system of claim 7, wherein the teleports metric includes a beacon density classifier, a device sensor classifier, a virtual BLE (Bluetooth Low Energy) placement classifier, and a weak received signal strength indicator (RSSI) classifier.

9. The system of claim 1, wherein the one or more location metrics include a user connect time metric indicative of an amount of time each of the plurality of client devices remains connected to location services provided by the network management system.

10. The system of claim 1, wherein the one or more processors are further configured to identify a location performance degradation associated with the wireless network based on the one or more location metrics.

11. The system of claim 10 wherein the one or more processors are further configured to:
generate a notification indicative of the location performance degradation associated with the wireless network; and
automatically invoke at least one remedial action to address the location performance degradation associated with the wireless network, wherein the at least one remedial action includes reconfiguring operation of at least one of the plurality of APs in the wireless network.

12. The system of claim 1, wherein the one or more processors are further configured to:
analyze aggregate location data for the plurality of client devices; and
determine whether client devices of a same type or having a same software version are experiencing similar location degradation issues.

13. A method comprising:
receiving, by one or more processors of a network management system that manages a plurality of access point (AP) devices associated with a wireless network, client-side data collected by a plurality of client devices associated with the wireless network;
receiving location data associated with each of the plurality of client devices generated in response to location requests, issued by the plurality of client devices, for a location service provided to the plurality of client devices; and
determining, by the one or more processors and based on at least one of the client-side data or the location data, one or more location metrics associated with the location requests issued by the plurality of client devices, wherein the one or more location metrics are indicative of whether the location requests satisfy a threshold indicative of a performance of the location service provided to the plurality of client devices.

14. The method of claim 13, wherein determining one or more location metrics further includes determining at least one of a latency metric indicative of a percentage of location requests satisfying a latency threshold, a dropped requests metric indicative of a percentage of location requests that were dropped due to a number of pending requests exceeding a pending requests threshold, a teleports metric indicative of a percentage of location requests in which a deviation from a previous determined location exceeds a teleports threshold, or a user connect time metric indicative of an amount of time each of the plurality of client devices remains connected to location services provided by the network management system.

15. The method of claim 13, wherein the client-side data includes received signal strength indicators (RSSI) for each of a plurality of wireless signals received by the plurality of client devices from the plurality of APs.

16. The method of claim 13, further comprising:
identifying a location performance degradation associated with the wireless network based on the one or more location metrics;
generating a notification indicative of the location performance degradation associated with the wireless network; and
automatically invoking at least one remedial action to address the location performance degradation associated with the wireless network, wherein the at least one remedial action includes reconfiguring operation of at least one of the plurality of APs in the wireless network.

17. A non-transitory computer-readable storage medium comprising instructions that, when executed, configure processing circuitry to:
receive client-side data collected by a plurality of client devices associated with a wireless network and receive location data associated with each of the plurality of client devices generated in response to location requests, issued by the plurality of client devices, for a location service provided to the plurality of client devices; and
determine, based on at least one of the client-side data or the location data, one or more location metrics associated with the location requests issued by the plurality of client devices, wherein the one or more location metrics are indicative of whether the location requests satisfy a threshold indicative of a performance of the location service provided to the plurality of client devices.

* * * * *